United States Patent [19]

Takimoto

[11] Patent Number: 4,889,673
[45] Date of Patent: Dec. 26, 1989

[54] PROCESS FOR PREPARING POLYVINYL CHLORIDE MATERIAL USED FOR EXTRUSION MOLDING

[75] Inventor: Masahiro Takimoto, Mie, Japan

[73] Assignee: Toyoda Gosei Co., Ltd., Nishikasugai, Japan

[21] Appl. No.: 280,356

[22] Filed: Dec. 6, 1988

[30] Foreign Application Priority Data

Jan. 22, 1988 [JP] Japan ................... 63-13386

[51] Int. Cl.⁴ ................... B29B 7/32; B29B 9/06; B29C 47/00
[52] U.S. Cl. ................... 264/118; 264/122; 264/143; 264/211; 264/349
[58] Field of Search ............ 264/118, 122, 141, 143, 264/210.6, 211, 211.12, 349

[56] References Cited

U.S. PATENT DOCUMENTS

| | | | |
|---|---|---|---|
| 3,101,241 | 8/1963 | McKee, Jr. | 264/122 |
| 3,287,480 | 11/1966 | Wechsler et al. | 264/122 |
| 3,562,373 | 2/1971 | Logrippo | 264/118 |
| 3,919,164 | 11/1975 | Hattori et al. | 264/141 X |
| 3,931,094 | 1/1976 | Segal et al. | 264/211 X |
| 4,012,348 | 3/1977 | Chelland et al. | 264/122 X |
| 4,491,553 | 1/1985 | Yamada et al. | 264/118 X |

*Primary Examiner*—Jeffery Thurlow
*Assistant Examiner*—Leo B. Tentoni
*Attorney, Agent, or Firm*—Cushman, Darby & Cushman

[57] ABSTRACT

Preparing process for polyvinyl chloride material used for extrusion molding suitable to high speed extrusion includes a step of dry blending a blend prepared by blending polyvinyl chloride (polymer) compounded with plasticizers stabilizers and other auxiliary materials while controlling the temperature for the blend within a range from room temperature to 165° C. and a step of kneading and pelletizing the blend after the dry blending step while controlling the temperature for the blend to lower than 165° C. The polyvinyl chloride used is a suspension polymerizate capable of satisfying the condition that the retention ratio on 80 mesh screen (ASTM: E11-58T) is less than 1%.

2 Claims, 1 Drawing Sheet

PROCESS FOR PREPARING POLYVINYL CHLORIDE MATERIAL USED FOR EXTRUSION MOLDING

BACKGROUND OF THE INVENTION

The present invention concerns a process for preparing polyvinyl chloride (hereinafter simply referred to as PVC) material used for extrusion molding from a blend prepared by blending PVC material with plasticizers, stabilizers and other auxiliary materials and subjecting the blend to a dry blending step, a kneading step and a pelletization step successively.

The preparing process according to the present invention is a method suitable to the preparation of PVC material for extrusion molding products such as protector moldings and trims for use on automobiles, the appearance of which is considered important.

In the case of preparing the PVC material used for extrusion molding as described above, PVC (polymer) used so far has been synthesized by suspension polymerization and has a grain size corresponding to the retention rate on 80 mesh screen (ASTM; E11-58T) of about 5%.

In the dry blending step, a blend prepared by adding auxiliary materials such as plasticizers, stabilizers and colorants to PVC is subjected to blending under high shearing force at a temperature (80°–110° C.) much lower than the usual melting point (170° C.) of PVC. The mixer used in this step is usually a high speed mixer such as a Henschel mixer or a super mixer.

In the kneading step and the pelletization step, the dry blend obtained as above (powdery product) has been kneaded in a single axis or a two-axis extruder, extruded as a strand of round or square cross section and then cut into an appropriate length by a cutter (rotary blade). The temperature in each of the kneading and pelletization steps is usually at 40°–100° C. on the material charging portion and at 170°–200° C. on the extrusion portion of an extruder.

In the case of extrusion molding at a high speed by using the PVC material produced as described above, irregularity (defective appearance) tends to occur at the surface of the extrusion molding product.

In this case, the surface irregularity as described above can substantially be eliminated from the extrusion molding product if the molding material is extruded after it has been kneaded and melted in a cylinder for a sufficient period of time, that is, if the extrusion speed is reduced. However, the reduction of the extrusion speed is not desired in view of the productivity.

In this case, the ratio of reducing the extrusion speed is within a range from 1 to 7 based on the speed for the conventional high speed extrusion being assumed as 10.

SUMMARY OF THE INVENTION

The present invention concerns a process for preparing PVC material used for extrusion molding from a blending product prepared by blending PVC obtained with suspension polymerization with other auxiliary materials such as plasticizers and stabilizers, by subjecting the blend successively to a dry blending step, a kneading step and a pelletization step, in which PVC of a grain size with the retention rate on 80 mesh screen (ASTM; E11-58T) of not more than 1% is used and the temperature for the blend is controlled from the room temperature up to 165° C. in each of the steps of the dry blending, kneading and pelletization.

The PVC material prepared by the process as described above results in no substantial irregularity at the surface of the extrusion molding product that would otherwise lead to the undesired appearance even if the extrusion molding is conducted at high speed.

DETAILED DESCRIPTION OF THE INVENTION

The present invention is to be described more specifically. In the explanation, "parts" indicating the blending unit mean "parts by weight".

(1) In the present invention, the PVC (polymer) used is synthesized by suspension polymerization and has a grain size with the retention rate on 80 mesh screen (ASTM: E11-58T) of not more than 1%. If the retention rate on the screen exceeds 1%, particles are less melted and not-melted particles remain as lumps tending to cause irregularity uneven on the surface of the extrusion molding product. In addition, the emulsion-polymerized PVC is poor in the heat stability and to be discolored easily.

(2) The dry blending step is conducted with controlling the agitation speed, the tank temperature etc. such that the blending temperature to lower than 165° C., usually, 80°–110° C. as in the usual case for the blending product prepared by adding and blending auxiliary materials such as plasticizers, stabilizers and colorants to PVC.

The blending amount of the plasticizer, in the case of obtaining a semi-regid PVC molding product such as a protector molding is from 20 to 50 parts based on 100 parts of PVC. As plasticizers, those customary phthalic acid derivatives can be exemplified such aas dioctyl phthalate (DOP), diiso-octyl phthalate (DIOP), dibutyl phthalate (DBP) and didecyl phthalate (DDP). If necessary, epoxy derivatives (epoxydized soybean oil), adipic acid derivatives, sebasic acid derivatives, phosphoric acid derivatives, etc. may be used in combinations or alone. In addition, customary stabilizers such as metal soaps, inorganic salts (barium and lead salts), organotin compounds, epoxy compounds (usually used together with metal stabilizers), etc. can be mentioned. The colorants can be properly selected and used among pigments (both organic and inorganic) and dyes.

The mixer used herein is a high speed mixer such as a Henschel mixer or a super mixer in the same manner as before.

Figure 1:
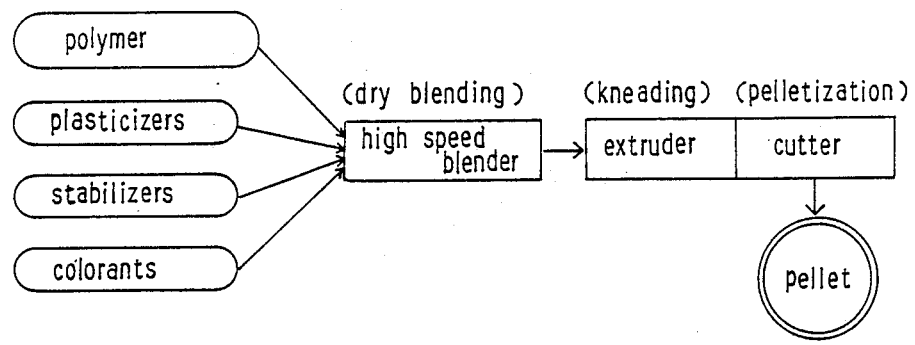
FIG. 1 is a step chart illustrating one embodiment for the preparation process of the PVC material and FIG. 2 is a schematic view for an extrusion molding machine having a rotary blade used for the kneading and pelletization steps.
Figure 2:
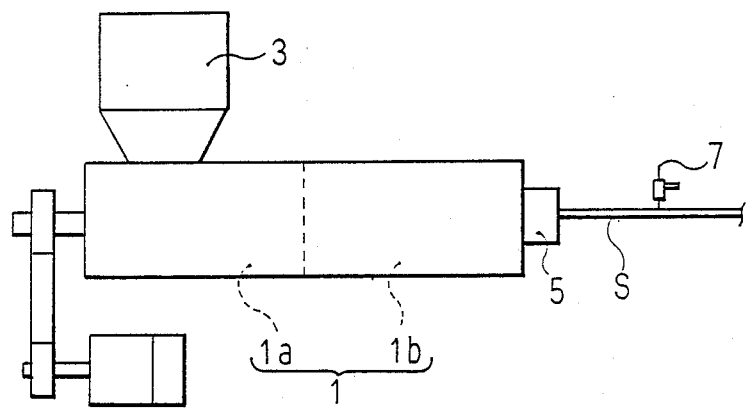

(3) In the kneading step and the pelletizing step, the dry blending product (powdery) obtained as described above is extruded by using a single axis or two-axis extruder as shown in FIG. 2 into a strand of round or square cross section after kneading and then cut into an appropriate length with a cutting machine (rotary blade 7).

In this case, the temperature for the material (blend) is controlled such that it is lower than 165° C., preferably, lower than 155° C. after the charging of the dry blend to the hopper 3 in the heat extrusion cylinder 1 and before the extrusion through the die 5 of an extrusion molding machine. The control is depended on a compulsory air cooling chamber disposed in the cylinder.

The PVC material prepared by the process as described above scarcely results in irregularity which would otherwise lead to undesirable appearance on the surface of the extrusion molding product even if the material is extrusion molded at a usual speed.

It is considered that undesirable appearance does not occur, because since each of the steps for the dry blending, kneading and pelletization upon production of the PVC material is conducted at a temperature lower than 5° C. or more than the melting temperature of PVC (170° C.), rearrangement of the polymer molecules is less conducted, that is, the PVC material is formed in the easily melted state and, accordingly, the plasticization efficiency is satisfactory.

In the prior art, temperature for the blending product becomes higher than the melting point of the PVC at least in the kneading step, causing re-arrangement of the polymer molecules more liably, that is, resulting in less melted state, which makes the plasticization efficiency not satisfactory upon extrusion molding.

It is further considered that since the grain size of the distribution of the PVC is made stringent, satisfactory kneading can be conducted even if the temperature is not higher than the melting point of the PVC also in the kneading step, and the heat transmission efficiency to the PVC material is satisfactory during extrusion molding. It is considered that the plasticization efficiency can be made satisfactory during extrusion molding also in view of the above.

EXAMPLES

Examples and comparative examples conducted for demonstrating the effects of the present invention are to be explained next.

(1) Using each of the polymers I, II shown in Table 1, the blend of the following preparation was applied with blending in a Henschel mixer (300 liter volume) till the temperature of the material was elevated to 100° C. (about 10 min) then cooled to the room temperature and subjected to dry blending.

| Blending Preparation | |
|---|---|
| PVC | 100 parts |
| DOP | 40 parts |
| Ba—Zn type liquid stabilizer | 3 parts |
| Epoxydized soybean oil | 3 parts |
| Pigment (carbon black) | 1 part |

(2) The dry blend was charged in a single axis extruder (L/D=23, D=20 mm φ, compression ratio=3.0, screw revolution speed=70 rpm), kneaded under the conditions (refer to FIG. 2) shown in Table 3, extruded into a strand shape of a round cross section (3 mm φ) and then cut into about 3 mm length with a rotary blade into pellets. The kneading condition are shown in Table 2.

(3) Each of the PVC materials obtained as described above was charged into a single axis extruder (L/D=23, D=40 mm φ, compression ratio=2.6, screw revolution speed=38 rpm), extruded under the conditions of a cylinder temperature from 100° to 150° C. and a die temperature at 160° C., into a tape-like product (rectangular cross section: 10×2 mm t, extrusion length: 1 m) and the presence or absence of surface unevenness (large: 1–10 mm φ, small: 0.05–1 mm φ) was observed visually. The results are shown in Table 3.

From the result of Table 3, the PVC material in each of the examples prepared under the conditions capable of satisfying the constituent factors of the present invention caused no irregularity at the surface of extrusion products, whereas surface irregularity occurred even when the kneading conditions were within the range of the present invention if the grain size distribution of the polymer used is coarse and does not meet the constituents of the present invention (comparative examples 3–5). In addition, if the kneading condition is higher than 165° C., that not satisfying the requirements in the present invention, surface irregularity also occurred at the surface of extrusion molding product (Comparative Examples 1-2) even when the polymer used could satisfy the conditions in the present invention.

TABLE 1

| Polymer | Retention rate on 80 mesh screen |
|---|---|
| I | 0.4% |
| II | 4.9% |

TABLE 2

| portion/temperature condition | A | B | C | a | b |
|---|---|---|---|---|---|
| cylinder (1a) | 120 | 130 | 140 | 150 | 160 |
| cylinder (1b) | 130 | 140 | 150 | 160 | 170 |
| die (5) | 140 | 150 | 160 | 170 | 180 |
| Highest material temperature (actually measured value) | 145 | 154 | 162 | 168 | 177 | numerical values in the blankets correspond to those in FIG. 2.

TABLE 3

| Test Number | polymer | Kneading condition | larger irregularity (1–10 mmφ) | smaller irregularity (0.05–1 mmφ) |
|---|---|---|---|---|
| Example 1 | I | A | None | None |
| Example 2 | I | B | None | None |
| Example 3 | I | C | None | None |
| Comparative Example 1 | I | a | Observed slightly | None |
| Comparative Example 2 | I | b | Observed apparently | None |
| Comparative Example 3 | II | A | None | Observed apparently |
| Comparative Example 4 | II | B | None | Observed apparently |
| Comparative Example 5 | II | C | Observed slightly | Observed apparently |

What is claimed is:

1. A process for preparing polyvinyl chloride material used for extrusion molding comprising:
   (1) a step of dry blending a blend prepared by blending polyvinyl chloride (polymer) with plasticizers and stabilizers, and optionally with colorants while controlling a temperature for the blend within a range from 20° C. to 165° C., and
   (2) a step of kneading and pelletizing the blend after the dry blending step while controlling a temperature for the blend within a range from 120° C. to 165° C., in which the polyvinyl chloride used is a product by suspension polymerization capable of satisfying the condition that the retention ratio on 80 mesh screen (ASTM: E11-58T) is less than 1%.

2. A process for preparing polyvinyl chloride material used for extrusion molding as defined in claim 1, wherein the temperature for the blend in the dry blending step is controlled within a range from 80° C. to 110° C.

* * * * *